(12) United States Patent
Andres

(10) Patent No.: US 6,460,882 B1
(45) Date of Patent: Oct. 8, 2002

(54) AIRBAG ACTUATION EVENT DISCRIMINATION SYSTEM AND METHOD

(75) Inventor: Robert M. Andres, Troy, MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/479,544

(22) Filed: Jan. 7, 2000

Related U.S. Application Data
(60) Provisional application No. 60/115,067, filed on Jan. 7, 1999.

(51) Int. Cl.[7] .............................................. B60R 21/32
(52) U.S. Cl. ........................................ 280/735; 701/45
(58) Field of Search ............................. 280/735; 701/45

(56) References Cited

U.S. PATENT DOCUMENTS

| | | | | |
|---|---|---|---|---|
| 5,483,451 A | * | 1/1996 | Ohmae et al. | 364/424.05 |
| 5,490,069 A | * | 2/1996 | Gioustsos et al. | 364/424.05 |
| 5,508,920 A | * | 4/1996 | Gioutsos et al. | 364/424.05 |
| 5,521,822 A | * | 5/1996 | Wang | 364/424.05 |
| 5,546,307 A | * | 8/1996 | Mazur et al. | 364/424.05 |
| 5,555,174 A | * | 9/1996 | Okimoto et al. | 364/424.05 |
| 5,668,720 A | * | 9/1997 | Takahashi et al. | 701/46 |
| 5,777,225 A | * | 7/1998 | Sada et al. | 73/488 |
| 5,809,439 A | * | 9/1998 | Damisch | 701/45 |
| 5,815,393 A | * | 9/1998 | Chae | 364/424.056 |
| 5,883,442 A | | 3/1999 | Saito | |
| 6,036,225 A | * | 3/2000 | Foo et al. | 280/735 |
| 6,181,998 B1 | * | 1/2001 | Kanameda et al. | 701/45 |
| 6,330,500 B1 | * | 12/2001 | Moriyama et al. | 701/45 |

FOREIGN PATENT DOCUMENTS

| | | |
|---|---|---|
| DE | 4117811 A1 | 12/1992 |
| EP | 0342401 A2 | 4/1989 |
| EP | 0427398 A3 | 10/1990 |
| EP | 0709257 A1 | 5/1996 |
| EP | 0715991 A1 | 6/1996 |
| GB | 2311157 A | 9/1997 |

OTHER PUBLICATIONS

Article: Suchowerskyj, W.: "Evolution en matiere de detecteurs de choc"; Ingenieurs de l'automobile (FR); 1982; Nr. 6; pp. 69–77.
PCT Search Report.

* cited by examiner

Primary Examiner—Paul N. Dickson
Assistant Examiner—L. Lum

(57) ABSTRACT

A system and method for selectively inhibiting deployment of an airbag for a period of time based upon the value of a sensor signal.

22 Claims, 4 Drawing Sheets

AIRBAG ACTUATION EVENT DISCRIMINATION SYSTEM AND METHOD

Cross-Reference to Related Applications

This application is a continuation of and claims priority under U.S. Provisional Application No. 60/115,067, filed Jan. 7, 1999.

BACKGROUND OF THE INVENTION

1. Technical Field of the Invention

The present invention relates to vehicle airbag systems, and more particularly to a vehicle airbag system and a method for discriminating between events for deploying airbags.

2. Background Information and Description of the Related Art (Including Information Disclosed Under 37 CFR§,§1.97 and 1.98)

Airbag systems are well known in the art. Generally, such systems include a sensor that provides a signal which is representative of various vehicle dynamic conditions, such as acceleration, and a control unit which evaluates the signals from the sensor and deploys the airbag when a warranting condition is believed to be present. The airbags are mounted within the vehicle cockpit to reduce the likelihood that an occupant may come into forceful contact with the vehicle cockpit during instances where the vehicle experiences high degrees of deceleration.

One area of concern in airbag systems is the need for systems to discriminate between events that should and should not result in the deployment of one or more of the airbags. A deploy event generally comprises a deceleration of predetermined severity wherein it is desirable to deploy the airbags, for example a rapid deceleration above a certain threshold speed. A non-deploy event may comprise either relatively low speed decelerations, or extraneous events such as impacting a shopping cart while driving in a parking lot. In both situations, it may not be desirable to deploy the airbags. Therefore, it is desirable to provide a vehicle airbag system which is capable of discriminating between deploy events and non-deploy events, and to deploy the airbags accordingly.

BRIEF SUMMARY OF THE INVENTION

The present invention is a system and method for actuating one or more vehicle airbags, where a discrimination is made between deploy events and non-deploy events in part by recognizing that non-deploy events are of a relatively short duration in comparison to deploy events. The present invention utilizes this characteristic by providing a control unit that inhibits the decision to deploy one or more of the airbags for a predetermined period after detecting a predetermined sensor signal characteristic, for example, a deceleration signal exceeding a predetermined threshold level. The decision to deploy the airbag is enabled after the predetermined time period has expired and the control unit determines a deployment criterion has been met. Also, the deployment decision may be enabled during the predetermined time period if the sensor signal characteristic exceeds an interrupt threshold level.

The present vehicle airbag system comprises a sensor adapted to provide a sensor signal indicative of vehicle dynamic conditions, the sensor signal providing an actuating characteristic in response to a predetermined vehicle dynamic condition, an airbag adapted to be deployed in response to a presence of an actuating signal, and a control module coupled to the sensor and the airbag, the control module evaluating the sensor signal and generating the actuating signal in response to detection of the actuating characteristic in the sensor signal, the control module disabling the generation of the actuating signal during a predetermined time period following detection of a threshold characteristic in the sensor signal.

The present invention also provides a method of actuating an airbag comprising the steps of: detecting an vehicle dynamic condition from the sensor signal; first evaluating the sensor signal to detect whether the sensor signal exceeds a first threshold level; disabling the deployment decision for a predetermined period after detecting that the sensor signal exceeds the first threshold level; and second evaluating the sensor signal to detect whether the sensor signal exceeds a second threshold level, and actuating the airbag the sensor signal exceeds the second threshold level after the predetermined time period.

BRIEF DESCRIPTION OF THE SEVERAL VIEWS OF THE DRAWING

The invention can be best understood by reference to the following description in conjunction with the drawings wherein.

DETAILED DESCRIPTION OF THE INVENTION

The present invention is a system having one or more deployable airbags, and a control module that discriminates between deploy events and non-deploy events and which enables deployment accordingly. Deploy events generally comprise relatively large force vehicle dynamic events, such as rapid decelerations above a threshold velocity, wherein it may be desirable to deploy the airbags. Non-deploy events generally comprise relatively small force vehicle dynamic events or higher force dynamic events of minimal duration.

The present vehicle airbag system is described with respect to a side airbag system. However, the principles of the present invention are also applicable to many other vehicle systems which include a device that is deployed or actuated by an actuation signal, for example, frontal airbag systems or seat belt systems where the belts are tensioned in response to an actuation signal.

Figure 1:
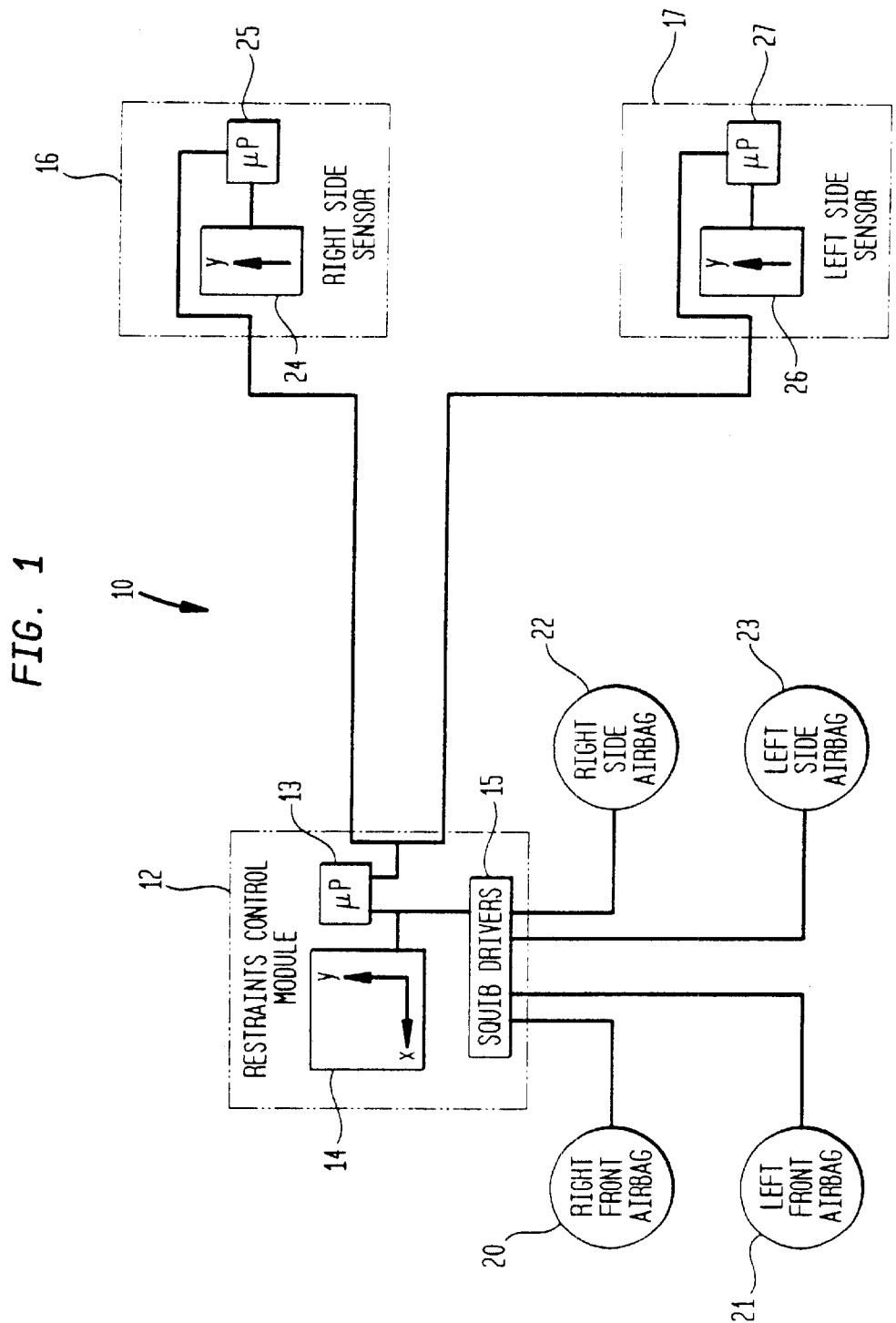
FIG. 1 is a block diagram illustrating elements of a vehicle airbag system having airbags.

Referring now to FIG. 1, vehicle airbag system 10 comprises side sensors 16 and 17. Advantageously, each sensor is mounted on a structural cross member of the vehicle and includes an accelerometer 24, 26 that provides a signal representative of the lateral acceleration experienced by the sensor. Alternatively, the side sensors 16, 17 may be mounted on the B-pillar, a door section, or any other lateral surface of the vehicle. Such other mounting positions are well known in the art and are not discussed in detail here. Each side sensor includes a respective micro controller 25, 27 that evaluates the lateral acceleration signal and determines whether one or more of the airbags 20–23 should be enabled for deployment. Based on the evaluation of the lateral acceleration signal, each side sensor 16, 17 provides a deployment signal to restraints control module 12.

Restraints control module 12 is coupled to side sensors 16, 17 and airbags 20–23. Restraints control module 12 includes micro controller 13, accelerometer 14 and squib drivers 15. When control module 12 receives a deployment enable signal from one of side sensors 16, 17, micro controller 13 evaluates the output from accelerometer 14 to verify the presence of a deployment condition before transmitting a deployment signal to squib drivers 15. The output from squib drivers 15 fires one or more squibs associated with a selected one or more of airbags 20–23. It may be appreciated that the signals from lateral accelerometers 24, 26 may be evaluated by micro controller 13 in addition to, or instead of, micro controllers 25, 27. Also, additional sensors may be added to detect frontal and angular vehicle dynamics as desired.

It is desirable that control module 12 deploy airbags 20–23 only in response to deploy events and not in response to non-deploy events. Vehicle airbag system 10 accomplishes this objective by recognizing that non-deploy events are of relatively short duration compared to deploy events. In this connection, micro controller 13 is programmed to disable the deployment decision for side airbags 22 and 23 during a predetermined time period following a designated event. Micro controller 13 is programmed using methods known to those in the art. In the present embodiment, the designated event is an indication that a lateral acceleration signal from one or more of accelerometers 14, 24, and 26 has exceeded a threshold acceleration level. Although the evaluation of the signals from accelerometers 14, 24, and 26 may continue during the predetermined time period, micro controller 13 inhibits the deployment decision for side airbags 22 and 23 during that time period. Disabling the deployment decision for side airbags 22 and 23 during this predetermined time period prevents undesirable deployments based upon short-duration high acceleration levels due to non-deploy events, and any other relatively short lived events, from deploying the side airbags. It can be appreciated that different vehicles may require different time periods. In the present embodiment a period of about 7.5 ms was found to provide the desired results.

After the predetermined time period has expired, the deployment of side airbags 22 and 23 is enabled, and micro controller 13 deploys the side airbags in accordance with an evaluation of the deployment criteria.

Additionally, the present invention overrides the disabling of the deployment decision during the predetermined time period if the acceleration signal, or a signal derived from the acceleration signal, exceeds an interrupt threshold level. In the present embodiment, a velocity signal generated from the acceleration signal is compared to a predetermined interrupt threshold. The interrupt threshold level is selected to indicate a severe vehicle dynamic event that requires rapid deployment of the airbags.

Figure 2:
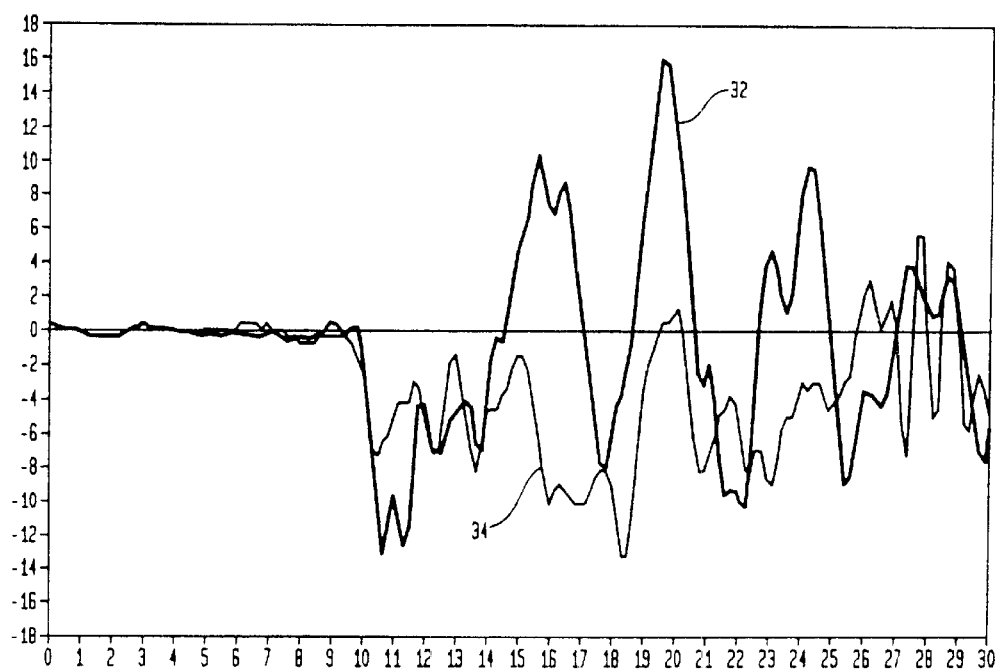
FIG. 2 is graph illustrating acceleration signals from both an non-deploy event and a deploy event.

FIG. 2 shows the acceleration signals from a non-deploy event and a deployment event, wherein the non-deploy event signal is generally indicated by reference numeral 32 and the deployment event signal is generally indicated by reference numeral 34. Calculation of the deployment algorithm begins at around 10 ms when the acceleration signals rapidly increase. As shown in FIG. 2, initially, between 10–12 ms, non-deploy event signal 32 generally is initially of a greater magnitude than the deployment event signal 34. The present invention inhibits the deployment decision of the side airbags during this time; here, given that the delay time period is set at 7.5 ms, the deployment decision is inhibited from 10 ms through 17.5 ms.

As the events progress in time, the magnitude of deployment event signal 34 in regards to deceleration exceeds the magnitude of non-deploy event signal 32. At about 17.5 ms, the deployment decision disable feature is terminated and deployment decision is re-enabled. The deployment decision occurs at about 18 ms in response to the evaluation of the deployment criteria.

Figure 3:
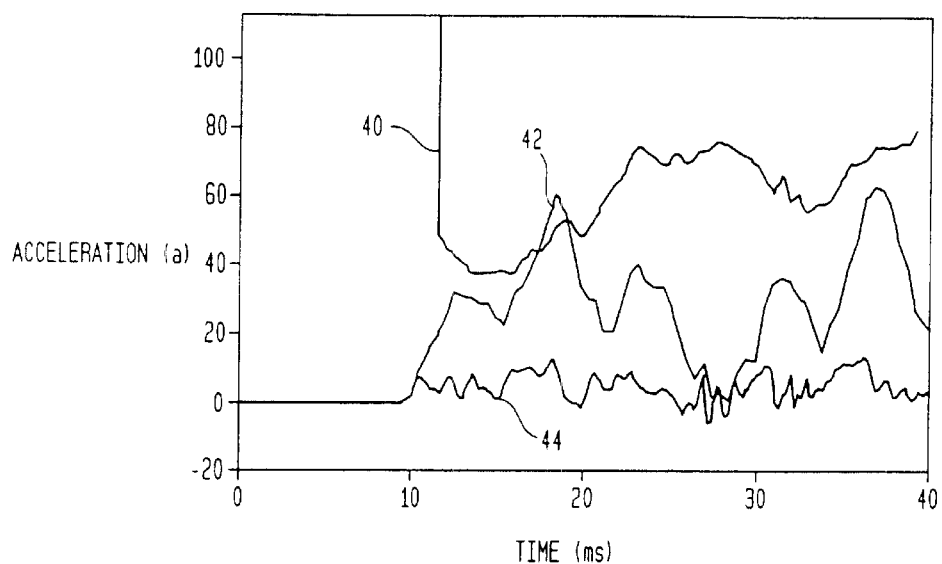
FIG. 3 is a graph illustrating a deploy event.

FIG. 3 shows the response of the present invention to a deployment event, in this case an 11 mph collision between a test vehicle and a side pole. The algorithm calculations begin at around 10 ms. A deployment threshold signal 40 and a deployment criterion signal 42 are calculated from the acceleration signal 44 and compared with each other. In the present embodiment, the deployment criterion signal 42 corresponds to a velocity signal integrated from the acceleration signal 44. The deployment decision disabling feature terminates at around 17.5 ms and side airbag deployment decision occurs at 18 ms when the deployment criterion signal 42 exceeds the deployment threshold signal 40.

Figure 4:
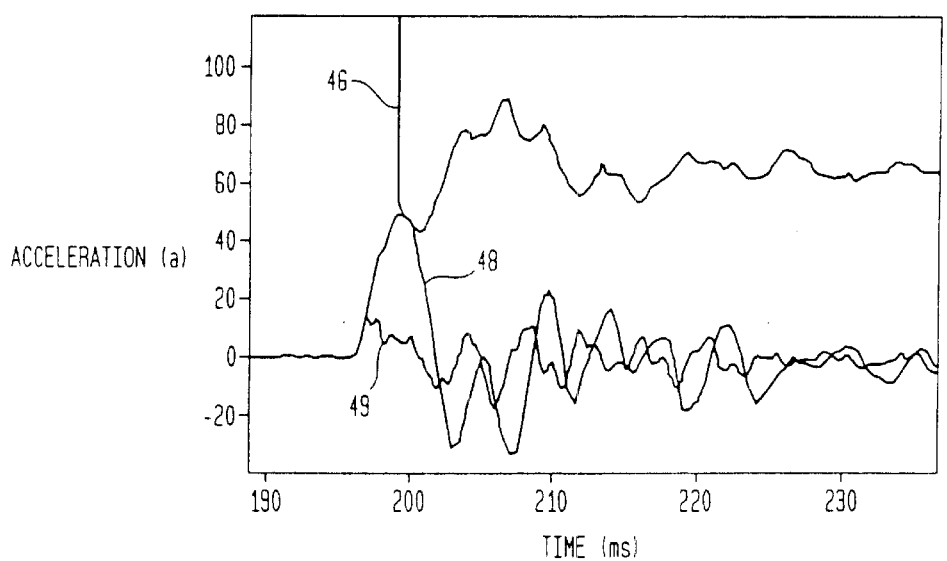
FIG. 4 is a graph illustrating a non-deploy event.

FIG. 4 shows the response of the present invention to a non-deploy event, in this case a pendulum ball being swung and impacted against the vehicle door. Again, a deployment threshold signal 46 and a deployment criterion signal 48 are calculated from the acceleration signal 49 and compared to determine whether the airbags should be deployed. The deployment criterion signal 48 starts out having a high magnitude, but experiences lower sustained magnitudes rather quickly. There is a very early crossing of the deployment threshold signal 46 by the deployment criterion 48, but the side airbags are inhibited from being deployed because the deployment decision is disabled during the 7.5 ms inhibit time, here from about 196 ms to 203.5 ms. The deployment decision disable feature is terminated at about 204 ms, but the deployment criterion signal 48 has subsided by that time and remains below the deployment threshold 46 thereafter. Therefore, it can be seen that the present invention enables deployment of the side airbags in response to deploy events while disabling the deployment decision in response to non-deploy events.

The present invention may be implemented in software code contained in a micro controller. In a simple implementation, a counter is initialized upon detecting a threshold acceleration level to set the predetermined time period. The counter is decremented after each loop run. During each loop run, if the counter is greater than zero and the velocity signal calculated from the acceleration signal does not exceed an interrupt threshold, then the decision to deploy the airbags based on an evaluation of a deployment criteria is skipped. When the counter reaches zero, deployment of the airbags in view of the deployment criteria is enabled. This procedure is described further below with reference to FIG. 5.

Figure 5:
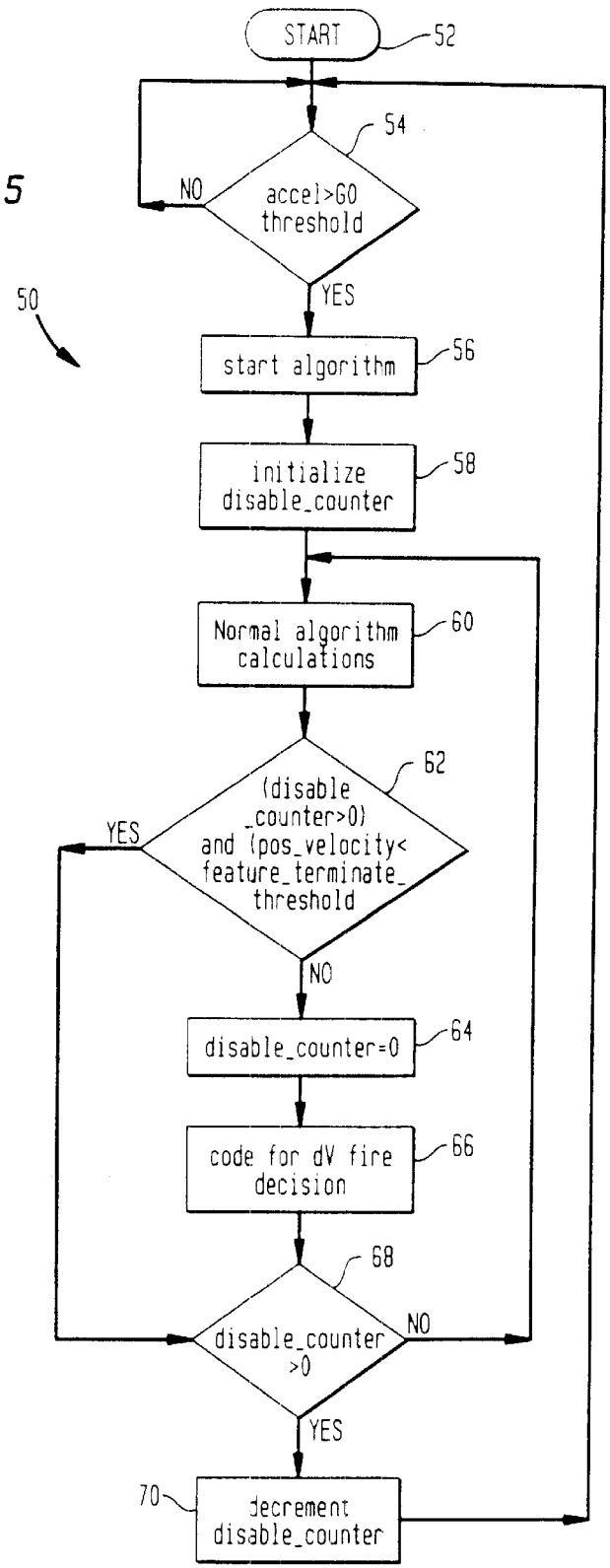
FIG. 5 is a flowchart illustrating the steps for enabling deployment of the airbags in accordance with the present invention.

The steps for discriminating between deploy events and non-deploy events in accordance with the present invention is shown in FIG. 5. The procedure starts (and restarts, as described later) at step 52, wherein steps 54–70 comprise a deployment algorithm and the disabling feature associated with the present invention. When the detected acceleration level exceeds a predetermined threshold in step 54, micro controller 13 in step 56 begins the algorithm to determine whether the airbags need to be deployed. At step 58, micro controller 13 initializes the disable counter. The disable counter is used to determine the length of time that the fire decision is inhibited. At step 60, micro controller 13 continues the deployment algorithm calculations for a particular period of time or a number of calculations as required by the deployment criteria. As this invention is not directed to the criteria used for deploying, it is sufficient to simply note that one of ordinary skill in the art may use the deployment criteria of their choice. At step 62, micro controller 13 determines whether the deployment decision should continue to be inhibited. If the disable counter is greater than zero and the calculated velocity is less than an interrupt threshold velocity, the inhibition procedure continues at step 68, otherwise the inhibition procedure is interrupted at step 64. At step 64, the disable counter is set at zero. At step 66, the deployment of the airbags is enabled and micro controller 13 deploys the airbags if required based upon evaluation of the separate deployment criteria. At step 68, it is determined whether the disable counter is greater than zero. If the disable counter has reached zero, then the disable period has expired and the procedure returns to step 60. If the disable counter is still greater than zero, there is still some time left in the inhibit time period. The disable counter is decremented by a predetermined amount at step 70.

In step 52, a start/restart decision may be made if desired. The decision steps described heretofore inhibited the deployment of the airbags for a fixed period of time upon the first detection of the acceleration exceeding an acceleration/deceleration threshold (step 54). However, step 52 may in the alternate provide for a moving window of deployment inhibition, where this window is restarted if the acceleration exceeds a restart threshold. Referring back to FIG. 2, the non-deploy signal 32 had both positive and negative accelerations. If the acceleration becomes positive (i.e. the signal is no longer decelerating, and it crosses the restart threshold of zero), it may be desirable to restart the inhibition timer. Likewise, the restart threshold could be set at a higher acceleration level than zero, such as +5 g, depending upon the needs of the situation. In such a way, the deployment decision may be effectively inhibited for greater periods of time if the acceleration signal exhibits significant positive and negative accelerations.

Although the invention has been described by reference to a specific embodiment, it should be understood that numerous changes may be made within the spirit and scope of the inventive concepts described. Accordingly, it is intended that the invention not be limited to the described embodiment, but that it includes all modifications encompassed within the spirit of the following claims.

I claim as follows:

1. An air bag system, comprising:
   at least one sensor adapted to provide a sensor signal;
   at least one air bag adapted to be deployed in response to a deployment signal; and
   at least one control module in communication with said sensor and with said air bag, said control module evaluating said sensor signal and inhibiting said deployment signal during a predetermined time period following detection of said sensor signal exceeding a first threshold, and ceasing inhibition of said deployment signal after said predetermined time period has expired and wherein said control module further compares said sensor signal to a second threshold during said predetermined time period, said second threshold being different than said first threshold, wherein said control module ceases inhibiting said deployment signal before expiration of said predetermined time period if said sensor signal exceeds said second threshold.

2. The system of claim 1, wherein said sensor comprises an accelerometer.

3. The system of claim 1, wherein said control module determines a deployment criterion signal as a function of said sensor signal, and wherein said deployment signal is communicated to said air bag when deployment criteria is satisfied.

4. The system of claim 1, wherein said sensor signal is an acceleration signal and said first threshold is a first acceleration threshold and wherein said second threshold is a second acceleration threshold greater than said first acceleration threshold.

5. The system of claim 1, wherein said sensor signal is an acceleration signal, said first threshold is an acceleration threshold, and said second threshold is an interrupt threshold and wherein said control module generates a velocity signal from said acceleration signal and compares said velocity signal to said interrupt threshold during said predetermined time period and said control module ceases inhibiting said deployment signal prior to expiration of said predetermined time period if said velocity signal exceeds said interrupt threshold.

6. A method of selectively inhibiting actuation of an air bag in a system having at least one air bag, having at least one sensor for providing a sensor signal, and having at least one control module for evaluating the sensor signal and for selectively enabling or inhibiting an air bag deployment signal wherein said air bag is actuated when it receives said deployment signal, said method including the steps of:
   detecting a value for the sensor signal;
   comparing the detected sensor signal value to a first threshold value;
   inhibiting the deployment signal for a predetermined period if the detected sensor signal value has exceeded the first threshold;
   comparing the detected sensor signal value to a second threshold value;
   ceasing inhibition of the deployment signal before the predetermined period has expired if the detected sensor signal value exceeds the second threshold value; and
   ceasing the inhibition of the deployment signal after the predetermined period has expired.

7. The method according to claim 6, further including the steps of:
   deriving a deployment criterion signal from the detected sensor signal;
   comparing the detected sensor signal value to the deployment criterion signal; and
   communicating the deployment signal to the air bag if the detected sensor signal value exceeds the deployment criterion signal.

8. The method according to claim 6, further including the steps of:
   deriving a deployment criterion signal from the detected sensor signal;
   comparing the detected sensor signal value to the deployment criterion signal; and
   communicating the deployment signal to the air bag if the detected sensor signal value exceeds the deployment criterion signal.

9. An air bag system, comprising:
   at least one sensor adapted to provide a sensor signal;
   at least one air bag adapted to be deployed in response to said sensor signal; and
   at least one control module in communication with said sensor and with said air bag, said control module preventing deployment of said air bag during a predetermined time period following detection of said sensor signal exceeding an initial threshold and deploying said air bag after said predetermined time period has expired and wherein said control module further compares said sensor signal to an interrupt threshold during said predetermined time period, said interrupt threshold being different than said initial threshold, said control module deploying said air bag prior to expiration of said predetermined time period if said sensor signal exceeds said interrupt threshold.

10. The system of claim 9, wherein said initial threshold is a first acceleration threshold and said interrupt threshold is a second acceleration threshold of greater magnitude than said first acceleration threshold.

11. The system of claim 9 wherein said sensor signal comprises an acceleration signal, said initial threshold comprises an acceleration threshold, and said interrupt threshold comprises a velocity threshold and wherein said control module generates a velocity signal from said acceleration signal and compares said velocity signal to said velocity threshold during said predetermined time period, said control module deploying said air bag prior to expiration of said predetermined time period if said velocity signal exceeds said velocity threshold.

12. The system of claim 9, wherein said control module determines a deployment criterion signal as a function of said sensor signal, and wherein said deployment signal is communicated to said air bag when deployment criteria is satisfied.

13. The system of claim 12, wherein a deployment decision occurs at about 18 ms in response to evaluation of said deployment criteria.

14. The system of claim 12, wherein said interrupt threshold indicates a vehicle dynamic event of a predetermined magnitude.

15. The system of claim 9, wherein said at least one sensor comprises a plurality of lateral acceleration sensors and wherein said at least one air bag is comprised of a plurality of side impact air bags.

16. The system of claim 9, wherein said predetermined time period is about 7.5 ms.

17. The system of claim 9, wherein a deployment decision is inhibited from approximately 10 ms to 17.5 ms.

18. The method according to claim 6, further including the step of setting the second threshold value to indicate a vehicle dynamic event of a predetermined magnitude.

19. The method according to claim 6, further including the step of setting the predetermined period to at least about 7.5 ms.

20. The method according to claim 6, further including the step of generating a deployment decision at about 18 ms in response to evaluating predetermined deployment criteria.

21. The method according to claim 6, wherein the sensor signal value is an acceleration value, the first threshold is a first acceleration threshold, and the second threshold is a second acceleration threshold greater than the first acceleration threshold and including defining an interrupt event when the sensor signal value exceeds the second acceleration threshold.

22. The method according to claim 6, wherein the sensor signal value is an acceleration value, the first threshold is an acceleration threshold, and the second threshold is an interrupt threshold and including generating a velocity signal from the acceleration value, comparing the velocity signal to the interrupt threshold, and ceasing inhibition of the deployment signal before the predetermined period has expired if the velocity signal exceeds the interrupt threshold.

* * * * *